(12) United States Patent
Aas et al.

(10) Patent No.: US 10,619,418 B2
(45) Date of Patent: Apr. 14, 2020

(54) TOP DRIVE LOAD MEASUREMENT WEIGHT ON BIT

(71) Applicant: Schlumberger Technology Corporation, Sugar Land, TX (US)

(72) Inventors: Brynjulv Aas, Kristiansand (NO); Øyvind Olimstad, Kristiansand (NO); Magnus Berg, Kristiansand (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 226 days.

(21) Appl. No.: 15/601,059

(22) Filed: May 22, 2017

(65) Prior Publication Data

US 2018/0335356 A1    Nov. 22, 2018

(51) Int. Cl.
E21B 19/02     (2006.01)
E21B 3/02      (2006.01)
E21B 44/00     (2006.01)

(52) U.S. Cl.
CPC ............... *E21B 3/02* (2013.01); *E21B 44/00* (2013.01); *E21B 19/02* (2013.01)

(58) Field of Classification Search
None
See application file for complete search history.

(56) References Cited

U.S. PATENT DOCUMENTS

| | | | | |
|---|---|---|---|---|
| 2,298,216 A | * | 10/1942 | Lamberger | E21B 19/04 173/20 |
| 3,871,622 A | * | 3/1975 | Larralde | E21B 19/09 175/27 |
| 4,139,891 A | * | 2/1979 | Sheldon | E21B 19/08 340/666 |
| 4,875,530 A | * | 10/1989 | Frink | E21B 19/08 175/27 |
| 6,918,454 B2 | | 7/2005 | Prior et al. | |
| 8,739,868 B2 | | 6/2014 | Zeineddine | |
| 2007/0140801 A1 | * | 6/2007 | Kuttel | E21B 19/16 408/129 |
| 2007/0251701 A1 | * | 11/2007 | Jahn | E21B 19/166 166/379 |
| 2010/0314100 A1 | | 12/2010 | Tepavac et al. | |
| 2012/0152530 A1 | * | 6/2012 | Wiedecke | E21B 19/07 166/250.01 |
| 2016/0145993 A1 | | 5/2016 | Gillan et al. | |

(Continued)

OTHER PUBLICATIONS

International Search Report and Written Opinion for the equivalent International patent application PCTUS2018/033771 dated Sep. 14, 2018.

*Primary Examiner* — Shane Bomar
*Assistant Examiner* — Steven A MacDonald
(74) *Attorney, Agent, or Firm* — Helene Raybaud

(57) ABSTRACT

A system for monitoring a drilling rig condition, the system comprising: a travelling block suspended via a drilling line from a crown block at the top of a mast of the drilling rig; a frame to which the drilling tools and/or a pipe string is mounted; at least one tie rod that connects the frame to the travelling block, wherein the at least one tie rod comprises a tensile sensor; and a control system that receives a signal corresponding to tension sensed by the tensile sensor, wherein the control system determines a drilling rig condition based at least in part on the signal received from the tensile sensor.

14 Claims, 10 Drawing Sheets

(56) References Cited

U.S. PATENT DOCUMENTS

2016/0245727 A1* 8/2016 Martin .................... G01L 1/225
2016/0290046 A1 10/2016 Orban et al.
2016/0369617 A1 12/2016 Zheng et al.

* cited by examiner

TOP DRIVE LOAD MEASUREMENT WEIGHT ON BIT

TECHNICAL FIELD

The present disclosure relates generally to the field of drilling wells. More particularly, the invention relates to methods and apparatus for driving top drives in wellbore drilling systems.

BACKGROUND

Top drives are used to suspend and rotate a string of drill pipe and/or casing in drilling applications. The top drive is supported by a drilling line wrapped on a set of sheaves and connected to drawworks at one end and a deadline anchor at the other end. The top drive supports the drill string via a thrust bearing. Mud may be pumped into the drill string via a swivel. Furthermore, the top drive generally includes one or more motors (electric or hydraulic) which generate(s) the rotation of the drill string. The reaction torque applied to the top drive may be transmitted to the mast via a top drive carriage that rides on mast guide rails.

Various measurements may be taken to manage the drilling process, including measurements of top drive conditions. Hookload and hook elevation above the rig floor are two such measurements. These measurements may be employed to calculate drilling parameters such as weight on bit (WOB), rate of penetration (ROP), and depth. A variety of other types of measurements are used to calculate these and other drilling parameters.

Sensors are distributed on the drilling rig to measure conditions directly or indirectly. Accordingly, non-linearities, reduced resolution, noise, etc. may be part of the measurement system and may or may not be corrected in the measurements. For example, hook load has been measured indirectly on the "dead-line" of the drilling line, near or on the anchor below the rig floor. Hookload has been measured by using hydraulic load cells at the dead line anchor. Generally, there is no correction for friction in the sheaves in this measurement. In addition, the weight of the travelling block, hook and top drive may limit the resolution of the hook-load measurement.

The use of a hydraulic load cell at the dead line anchor is illustrated in U.S. Pat. No. 6,918,454. A load sensing device, such as a strain gage or a hydraulic load cell is affixed to the dead line and produces an output control signal indicating the tension in the dead line and consequently, the load carried by the traveling block or pull on the drill bit (POB). This POB measurement from the load sensing device is sent from the strain gage to the control system. Various tension measuring devices may be employed to indicate the tension conditions on the dead line. The actual hook load or POB may be calculated using the load sensing device input in conjunction with the number of lines strung and a calibration factor. Alternatively, a conventional load cell, hydraulic tension transducers or other load measuring device may be associated with the derrick to provide the output control signal representative of the load carried by the traveling block.

A more direct hookload measurement has been taken by installing measurement and communication devices on top of the drill string. For example, hydraulic load cells have been installed at the crown block. Alternatively, hookload measurement devices rotate with the drill string. When such devices are installed, communication between these systems attached to (and rotating with) the drill string to the rig system may be performed either by rotary transformer (inductive coupling), or sliding contacts or e-mag communication (such as WIFI). The main node is thus at the rig, resulting in long communication paths form the rotating devices with risk of signal corruption.

More recently, modern rigs (mainly offshore) have used top drives with built-in horizontal-mounted load cell pins positioned between the travelling blocks and the top drives. Other hookload measuring systems have load cells installed in pins on the crown block, load cells installed in the deadline, or strain measurement sensors installed on the Steel Wire Rope (SWR).

A horizontal mounted load cell pin is illustrated in US Publication No. 2016/0245727. One or more strain gauge sensors are located in each load bearing clevis pin required to lock the crown block into its position. One conventional installation includes four load pins providing four load measurements. For an accurate measurement in a marine environment all four sensors need to be operational as the load distribution across the four pins is not expected to be homogenous.

Due to various reasons, the accuracy of such load cells have proven to have significant deviation from real load. It is a fact that monitoring load via horizontal load pins that monitor shear forces by design have limitations regarding accuracy. Thus, more accurate devices are needed to monitor the weight of tubular and ancillaries lowered and/or hoisted out from a drilling well.

SUMMARY

In accordance with the teachings of the present disclosure, disadvantages and problems associated with existing weight monitoring devices are overcome by providing a much higher precise load measurement system.

An aspect of the invention provides a method for monitoring a drilling rig condition, the method comprising: suspending a drilling tool from a travelling block via at least one tie rod; fixing a tensile sensor to the at least one tie rod, wherein the tensile sensor generates a signal representative of tension in the at least one tie rod; communicating the signal from the tensile sensor to a control system; and monitoring the signal with the control system.

According to a further aspect of the invention, there is provided a system for monitoring a drilling rig condition, the system comprising: a travelling block suspended via a drilling line from a crown block at the top of a mast of the drilling rig; a frame to which the drilling tools and/or a pipe string is mounted; and a suspension system that connects the frame to the travelling block, wherein the suspension system comprises a tensile sensor.

A system for monitoring hookload in a drilling rig, the system comprising: a travelling block suspended via a drilling line from a crown block at the top of a mast of the drilling rig; a frame to which the drilling tools and/or a pipe string is mounted; at least one tie rod that connects the frame to the travelling block, wherein the at least one tie rod comprises a strain gauge; and a control system that receives a signal corresponding to tension sensed by the strain gauge, wherein the control system determines hookload based at least in part on the signal received from the strain gauge.

BRIEF DESCRIPTION OF THE DRAWINGS

A more complete understanding of the present embodiments may be acquired by referring to the following description taken in conjunction with the accompanying drawings, in which like reference numbers indicate like features.

DETAILED DESCRIPTION

Figure 1:
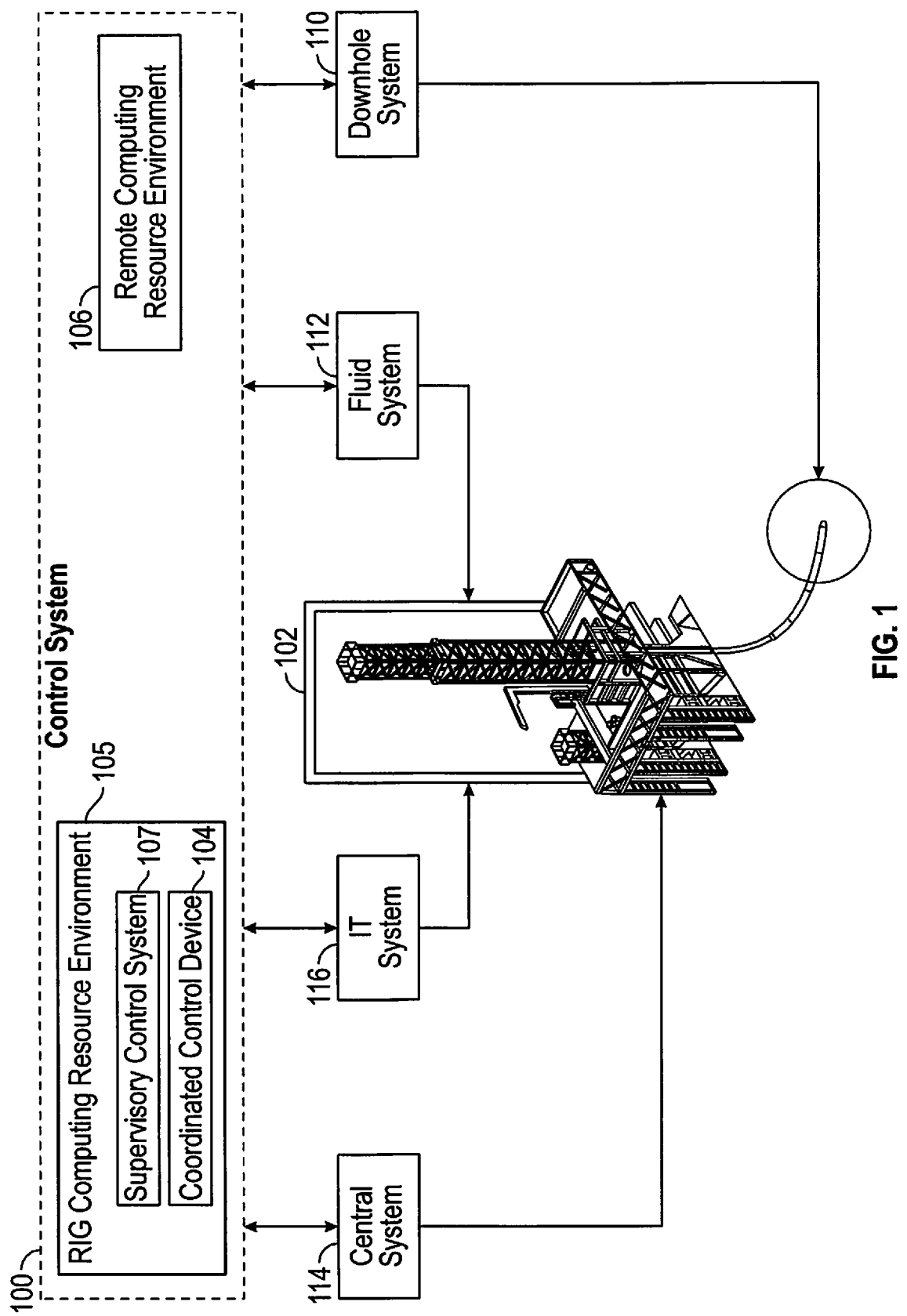
FIG. 1 illustrates a schematic view of a drilling rig and a control system.

Preferred embodiments are best understood by reference to FIGS. 1-7B below in view of the following general discussion. The present disclosure may be more easily understood in the context of a high level description of certain embodiments.

Embodiments of the present invention provide a top drive with a much higher precise load measurement system, wherein strain gauges may be built into vertical tie rods that are used to suspend the top drive from the travelling block. This solution allows the built-in strain gauges to only monitor tensile stress (and not shear force), wherein the accuracy of the tensile stress measurement may be very high.

A test of tie rods with built-in Weight on Bit sensors was conducted. The purpose of the test was to verify that tie rods with built-in strain gauges (WOB sensors) will provide the load measurement within an accuracy of 99.5% over the full range and 99.7% from 5 to 50% of the range. The test was carried out on one set of tie rods (4 individual tie rods). In advance of the tests, each tie rod was: subjected to dimensional control and verified to comply with detail drawings; MTR checked and verified to comply with specifications; fitted with strain gauges and signal checked; installed in a tensile machine and electrically hooked up to an amplifier and a reader; and exposed to 150% tensile load and "zeroed out." A calibrated tensile machine with calibrated rating ≥13,000 KN (150 sh-tons) was used for the test. Tests on each tie rod were conducted by applying tensile loads. The applied loads (ref tensile machine) readings and the tie rod (strain gauge) readings were recorded and compared. Tests included: increasing to target load; decreasing to target load; and directly obtaining target load. For increasing load tests, the tensile load was reduced to zero between all tests. For decreasing load tests, the load was raised to minimum 110% of load level prior to reduce to test value. For all tests, the load was held steady for a minimum of 5 seconds after stable values had been achieved. The test results are for the tie rods only. The test results confirmed that Weight on Bit sensor accuracy deviation within 750 kips (375 sh-tons) load is limited to ≤0.06%. At a peak of 1000 kips (500 sh-tons) the deviation is ≤0.12%. These test results suggest that in operation: by hoisting 50 tons net in the elevator the mis-reading will be limited to ±90 lbs; by hoisting 100 tons net in the elevator the mis-reading will be limited to ±150 lbs; and by hoisting 300 tons net in the elevator the mis-reading will be limited to ±390 lbs. Thus, laboratory tests confirm deviation of ≤0.5% over FS.

By having strain gauges built into the vertical suspension system, a more accurate solution may be provided for both onshore and offshore drilling applications. The invention is therefore of interest for all drilling rigs, with all kinds of top drives and drilling equipment, where high WOB measurement precision is a request/demand.

The invention includes one or more steel bar(s) or rods(s) that may suspend the top drive from the travelling block so that all vertical tensile loads from drilling and tripping operations are transferred via this/these bar(s)/rod(s).

These bar(s)/rod(s), here also named tie rods, have built in strain gauges that provide an electrical signal if the tie rod becomes subject to and tensile force. The strain gauges may be glued inside the tie rod in configuration (strain gauge bridge) in such a way the measure the force even if it comes from a non-straight line.

Electrical wires from the strain gauges are terminated into a small amplifier also mounted onto the tie rod. From here the signal can be transferred to the top drive control system.

Strain gauges may be built-into tie rods at a manufacturing facility. The tie rods may then be calibrated on a tensile machine that is used to calibrate one each of all the tie rods in a set. Each tie rod may have a unique serial number and all tie rods may be delivered with a calibration report having reference to the unique serial numbers.

In a present example embodiment, the hookload may be measured simultaneously with other measurements. For example, the drilling and measurement system may include a torque sensor in a sub disposed proximate the top of the drill string, and may communicate wirelessly to the control system. The torque sensor may be implemented as a current sensor coupled to an electric motor used to drive the top drive quill. An axial load (weight) on the hook, may be measured by hookload sensors, which may be implemented, for example, as a strain gauges in the suspension system. The top drive may also include an elevation sensor for determining the elevation of the top drive at any moment in time. The elevation sensor may be implemented, for example as an acoustic or laser distance measuring sensor. Measurements of elevation with respect to time may be used to determine a rate of axial movement of the drill string. The elevation sensor may also be implemented as a rotary encoder coupled to a winch drum used to extend and retract a drill line used to raise and lower the top drive. A computer may control the drilling operation via measured characteristics, including: rate of vertical movement, top drive rotational speed or drill string rotational speed, torque and axial loading (weight) made at the surface and/or in a MWD module.

In general, embodiments of the present disclosure may provide a top-drive system, which may take measurements and/or process measurement data within the top-drive. Various different types of sensors will be described below, which may be implemented within or near the frame of the top drive. Further, the sensors may communicate with a controller, which may also be disposed within or near the frame. The sensors may acquire the measurement data and provide the data to the controller, which may, in turn, process and/or communicate the data with a rig control system that is remote or otherwise external to the top-drive system.

The hookload measurement system of the present invention may be used with a rig control system as disclosed in US Publication No. 2016/0290046, incorporated herein by reference in its entirety. FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection).

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, etc.). An embodiment of the control system 100 that is unified, may, however, provide control over the drilling rig 102 and its related systems (e.g., the downhole system 110, fluid system 112, and/or central system 114).

Figure 2:
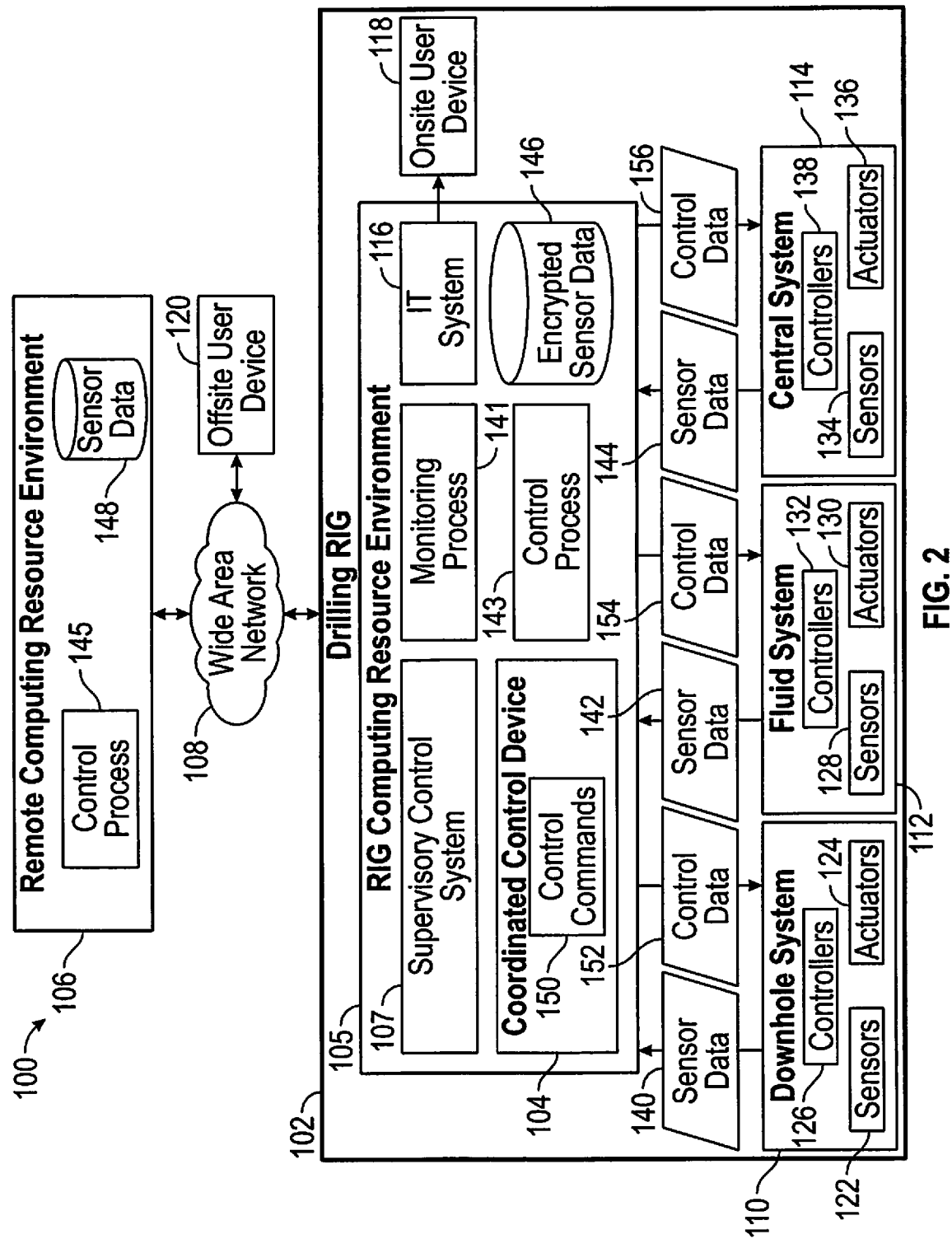
FIG. 2 illustrates a schematic view of a drilling rig and a remote computing resource environment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The systems of the drilling rig 102 may include various sensors, actuators, and controllers (e.g., programmable logic controllers (PLCs)). For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data at the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. The variation in measurements at different locations over time may be used to determine equipment performance, system performance, scheduled maintenance due dates, and the like. For example, slip status (e.g., in or out) may be acquired from the sensors and provided to the rig computing resource environment 105. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands.

In some embodiments, control of the various systems of the drilling rig 102 may be provided via a three-tier control system that includes a first tier of the controllers 126, 132, and 138, a second tier of the coordinated control device 104, and a third tier of the supervisory control system 107. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The encrypted sensor data 146 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 148 may be restricted via access control implemented in the rig computing resource environment 105. In some embodiments, the encrypted sensor data 148 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a thin client configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. A user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration.

In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

Figure 3:
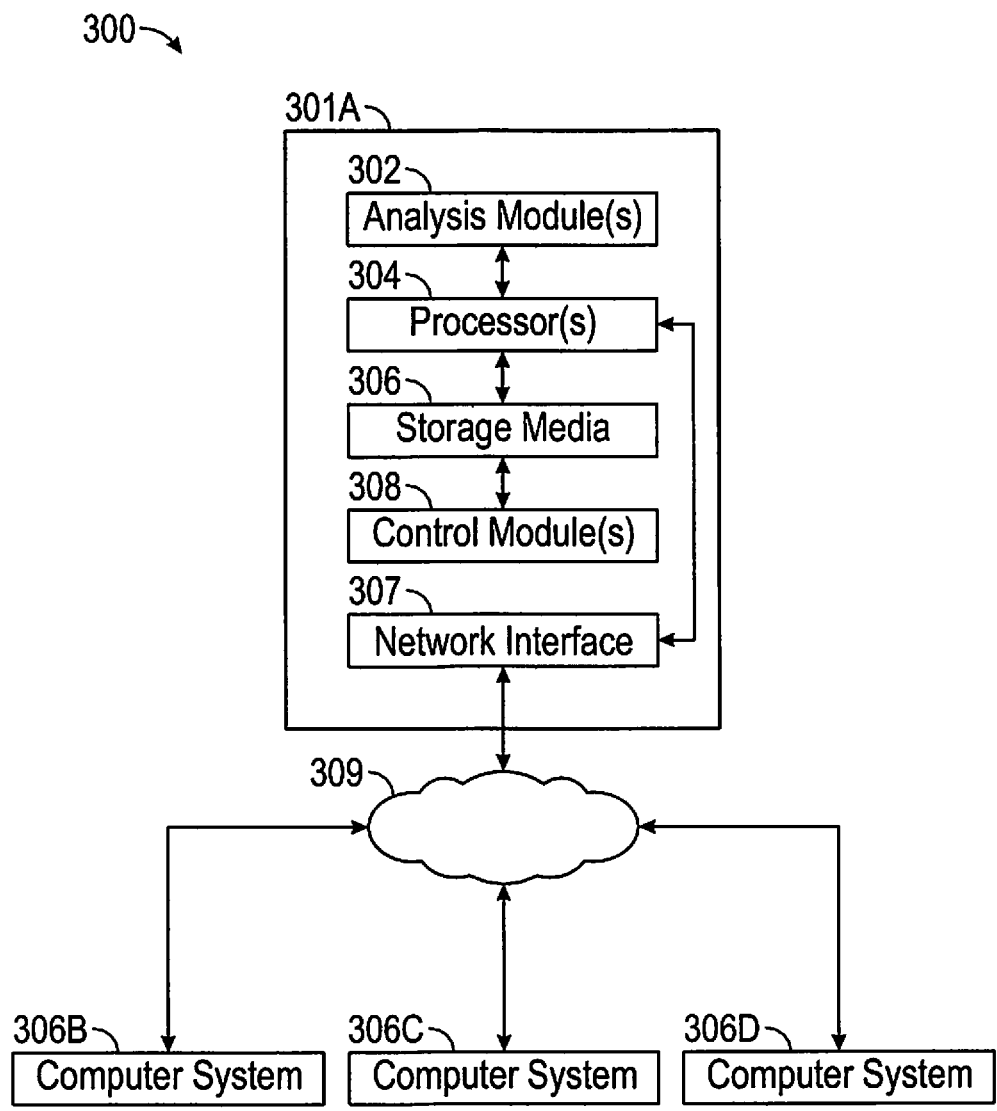
FIG. 3 illustrates a schematic view of a computing system.

In some embodiments, the methods of the present disclosure may be executed by a computing system. FIG. 3 illustrates an example of such a computing system 300, in accordance with some embodiments. The computing system 300 may include a computer or computer system 301A, which may be an individual computer system 301A or an arrangement of distributed computer systems. The computer system 301A includes one or more analysis modules 302 that are configured to perform various tasks according to some embodiments, such as one or more methods disclosed herein. To perform these various tasks, the analysis module 302 executes independently, or in coordination with, one or more processors 304, which is (or are) connected to one or more storage media 306. The processor(s) 304 is (or are) also connected to a network interface 307 to allow the computer system 301A to communicate over a data network 309 with one or more additional computer systems and/or computing systems, such as 301B, 301C, and/or 301D (note that computer systems 301B, 301C and/or 301D may or may not share the same architecture as computer system 301A, and may be located in different physical locations, e.g., computer systems 301A and 301B may be located in a processing facility, while in communication with one or more computer systems such as 301C and/or 301D that are located in one or more data centers, and/or located in varying countries on different continents).

A processor may include a microprocessor, microcontroller, processor module or subsystem, programmable integrated circuit, programmable gate array, or another control or computing device.

The storage media 306 may be implemented as one or more computer-readable or machine-readable storage media. Note that while in the example embodiment of FIG. 3 storage media 306 is depicted as within computer system 301A, in some embodiments, storage media 306 may be distributed within and/or across multiple internal and/or external enclosures of computing system 301A and/or additional computing systems. Storage media 306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 300 contains one or more rig control module(s) 308. In the example of computing system 300, computer system 301A includes the rig control module 308. In some embodiments, a single rig control module may be used to perform some or all aspects of one or more embodiments of the methods disclosed herein. In alternate embodiments, a plurality of rig control modules may be used to perform some or all aspects of methods herein.

It should be appreciated that computing system 300 is only one example of a computing system, and that computing system 300 may have more or fewer components than shown, may combine additional components not depicted in the example embodiment of FIG. 3, and/or computing system 300 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Figure 4A:
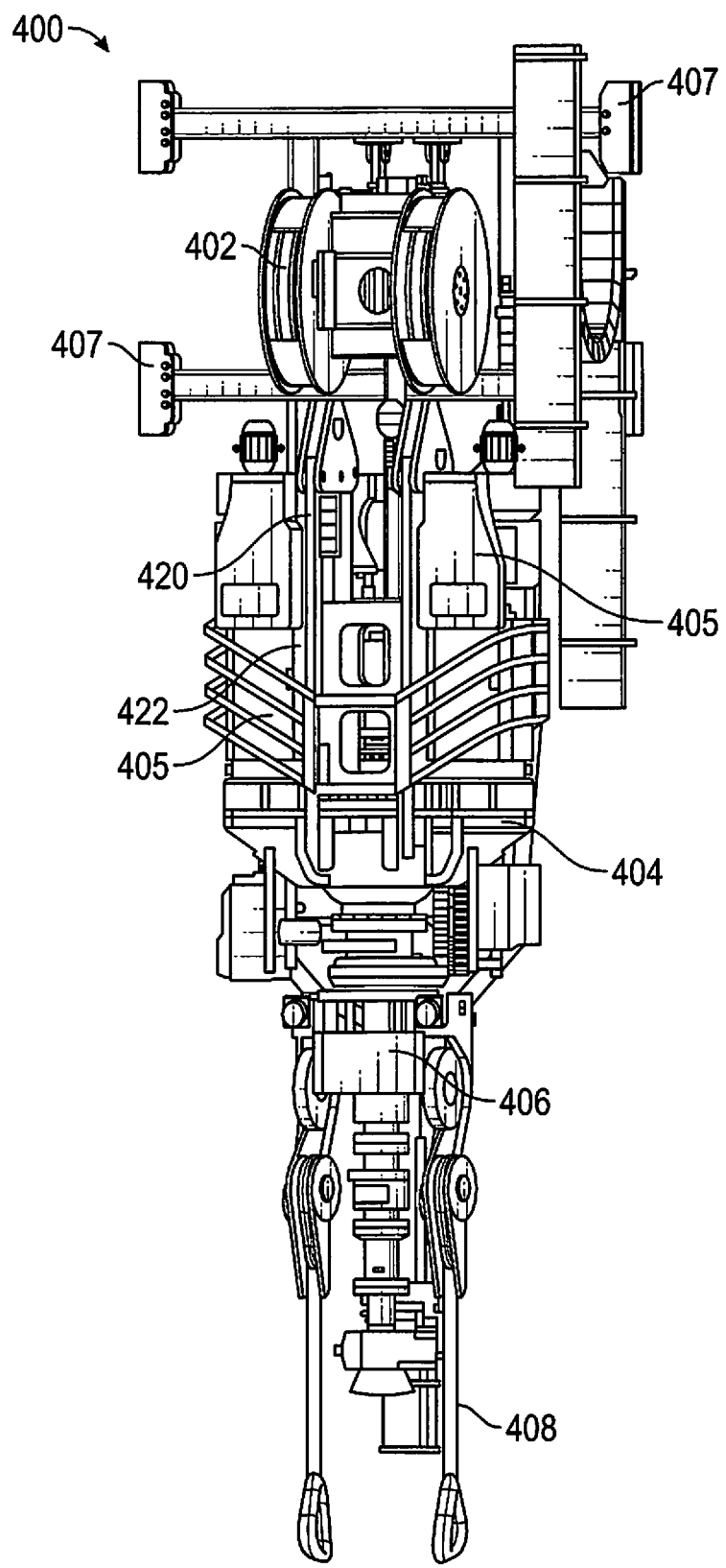
FIG. 4A shows a perspective view of a top drive for drilling operations within a drill rig system.

Referring to FIG. 4A, a perspective view of a top drive 400 of the present invention is illustrated. A travelling block 402 suspends the top drive 400 to via the winch line of the drawworks (not shown). The travelling block 402 supports a suspension system 420 that comprises four separate tie rods 422. A gearbox assembly 404 hangs from the suspension system 420. The gearbox assembly 404 has two AC motors 405 mounted on top of each side to power the top drive 400. A retractable dolly 407 mounts to the back of the gearbox assembly 404 to guide the top drive up and down a mast of a drill rig (not shown). A pipehandler assembly 406 is mounted to the bottom of the gearbox sub assembly 404. Elevator links 408 hang from the pipehandler assembly 406.

Figure 4B:
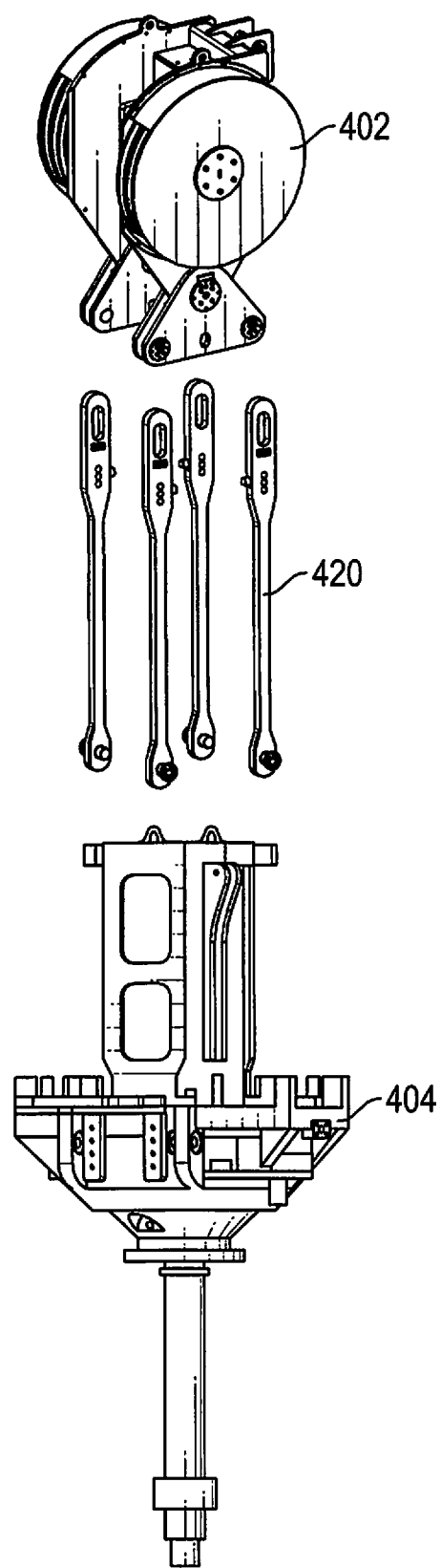
FIG. 4B illustrates an exploded perspective view of several of the top drive components shown in FIG. 4A.

FIG. 4B shows an exploded perspective view of some of the components of the top drive 300 shown in FIG. 4A. The travelling block 402 supports a suspension system 420 that comprises four separate tie rods 422. A gearbox assembly 404 hangs from the suspension system 420.

Figure 5:
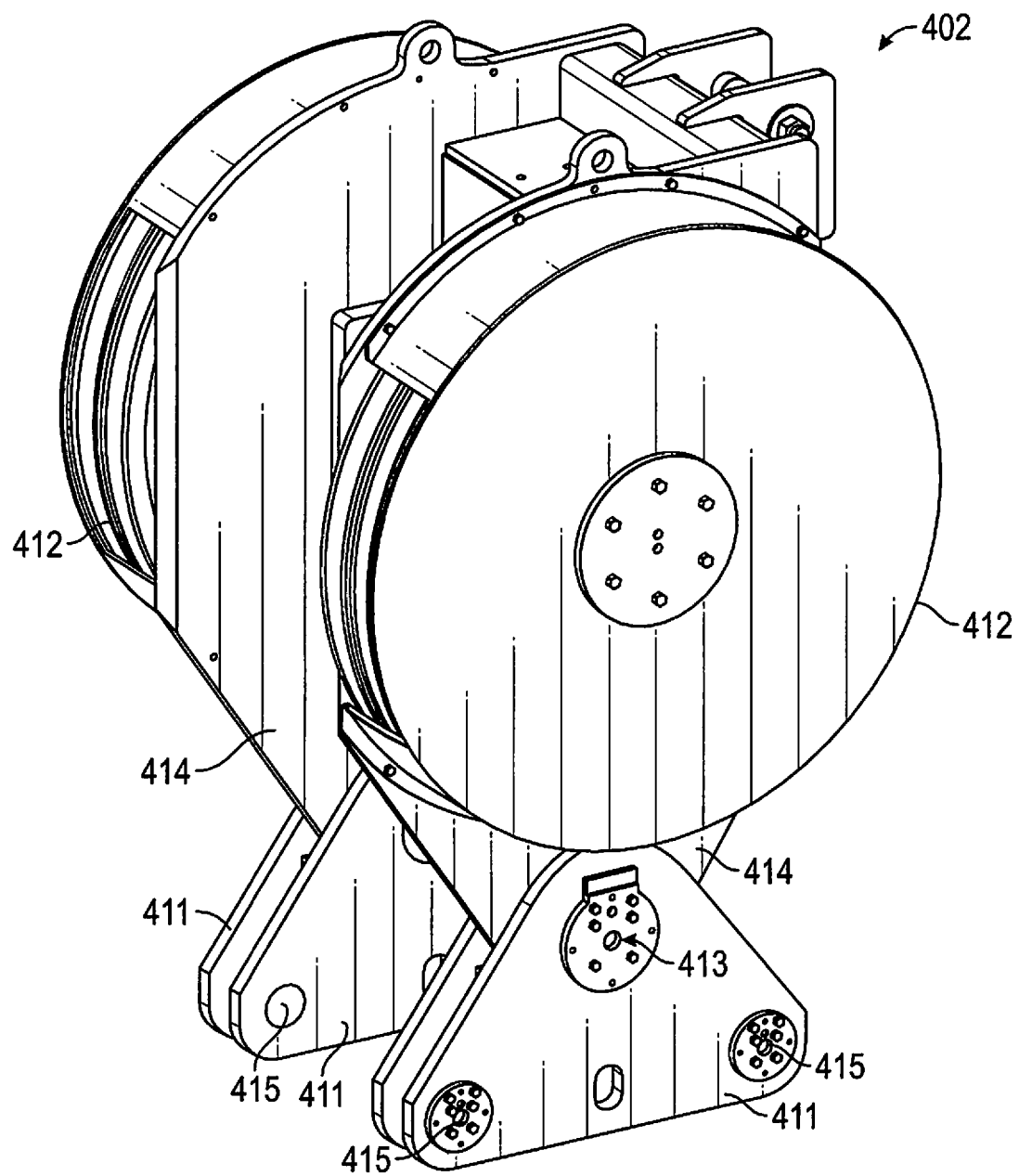
FIG. 5 shows a perspective view of a travelling block for suspending the top drive shown in FIG. 4A.

FIG. 5 is an enlarged illustration of the travelling block 402 shown in FIGS. 4A and 4B. The travelling block 402 is a split-block configuration that allows access to a washpipe (not shown) in the center of the top drive, wherein two sheaves 412 are on each side of the block. Four triangle plates 411 hang from the block, wherein two triangle plates 411 hang from each side of the block. A block flange 414 extends downwardly from each side of the block. Two triangle plates 411 are connected to each block flange 414 via a pivot pin 413. In particular, a triangle plate 411 is positioned on each side of the block flange 414 and the pivot pin 413 extends through aligned holes in the triangle plates 411 and the block flange 414. The triangle plates 411 also have holes in their lower corners for receiving upper bail pins 415, for securing tie rods 422, as described more fully below.

Figure 6A:
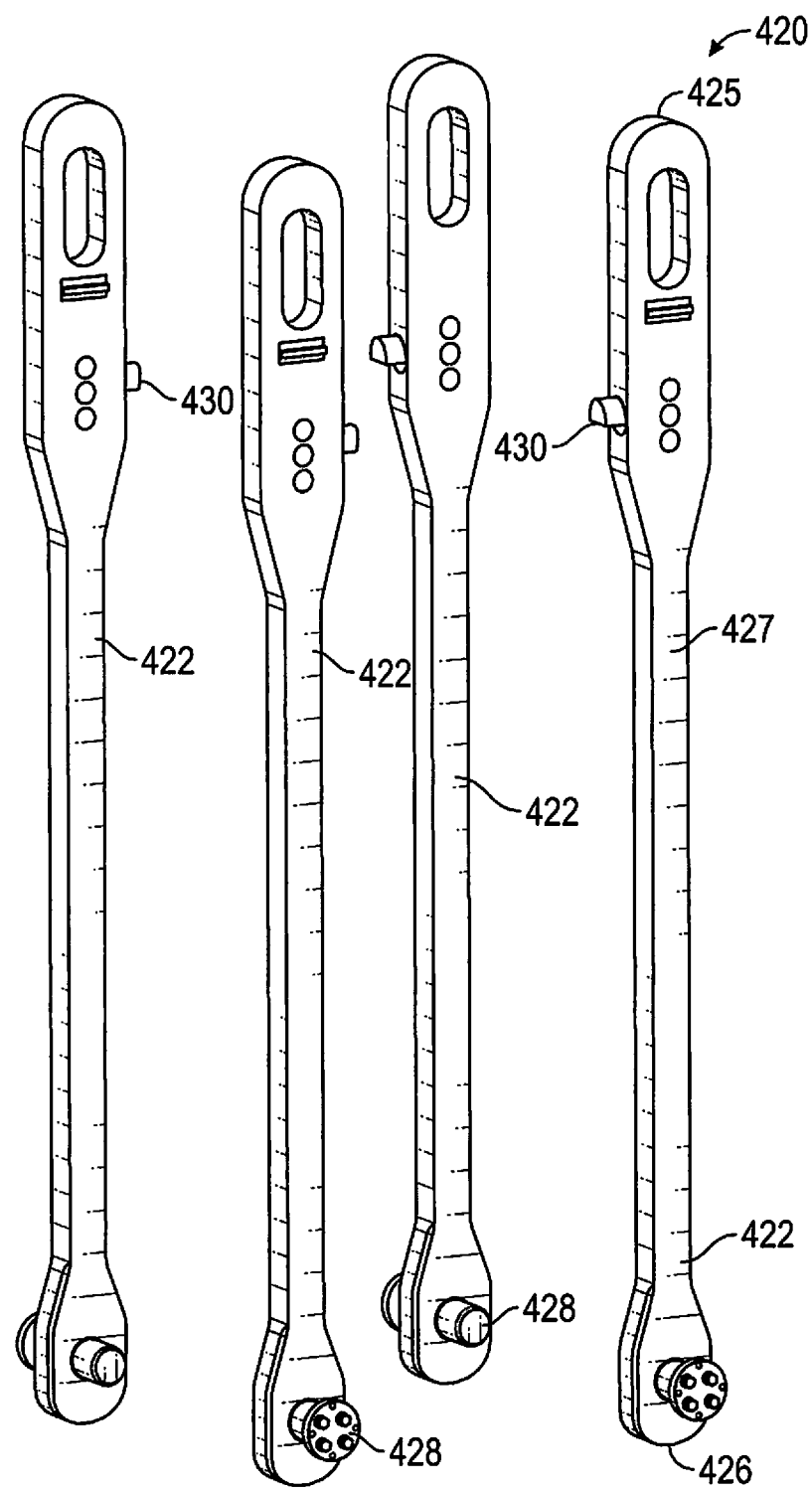
FIG. 6A is a perspective view of a suspension system comprising four tie rods.
Figure 6B:
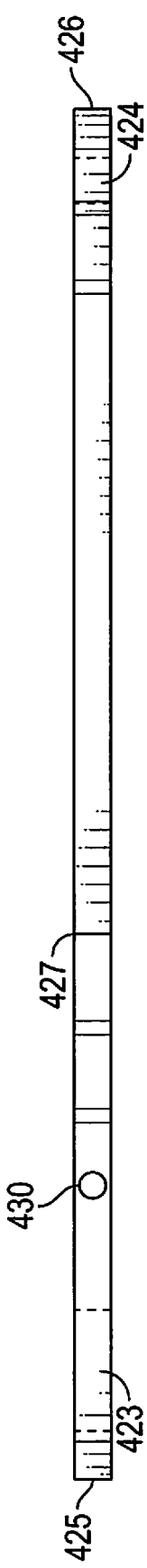
FIG. 6B is a side view of a tie rod of the suspension system of FIG. 6A.
Figure 6C:
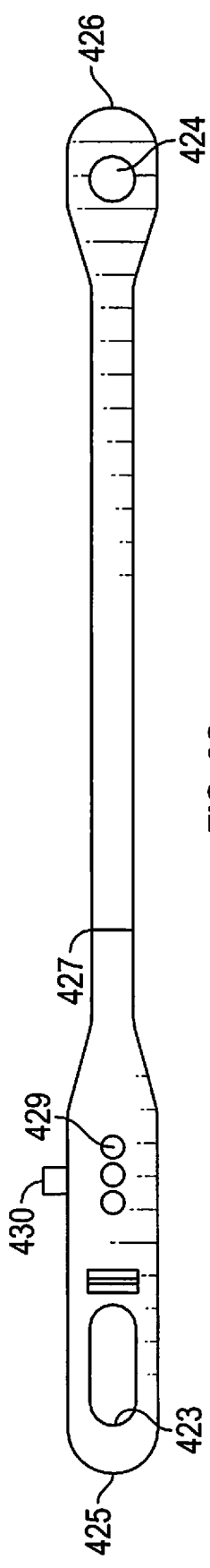
FIG. 6C is a top view of a tie rod of the suspension system of FIG. 6A.
Figure 6D:
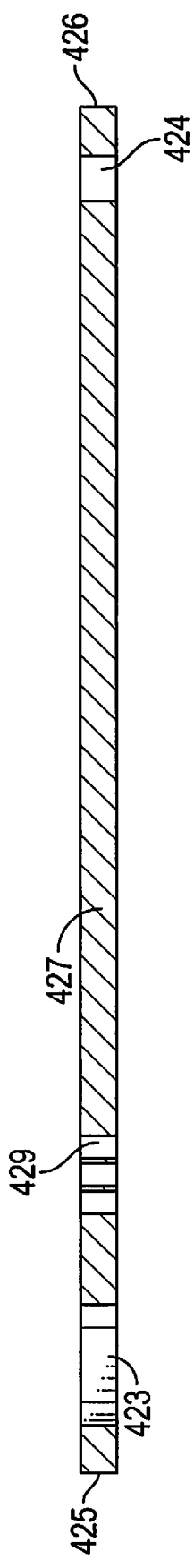
FIG. 6D is a side, cross-sectional view of a tie rod of the suspension system of FIG. 6A.

FIG. 6A illustrates a perspective view of the suspension system 420, which comprises four separate tie rods 422. FIGS. 6B-6D show side, top, and side cross-sectional views of a tie rod 422. Each tie rod 422 has an upper end 425 and a lower end 426, wherein the ends are connected by a rod portion 427. Each tie rod 422 has an upper pin receiving hole 423 and a lower pin receiving hold 424. The tie rods 422 suspend the gearbox assembly 404 from the travelling block 402. The upper end 425 is inserted between two triangle plates 411 (see FIG. 5) so that the upper pin receiving hole 423 aligns to receive an upper bail pin 415, which extends through the first triangle plate 411, the tie rod 422, and the second triangle plate 411. All four tie rods 422 may be similarly assembled to the triangle plates 411 of the travelling block 402 via upper bail pins 415.

Figure 7A:
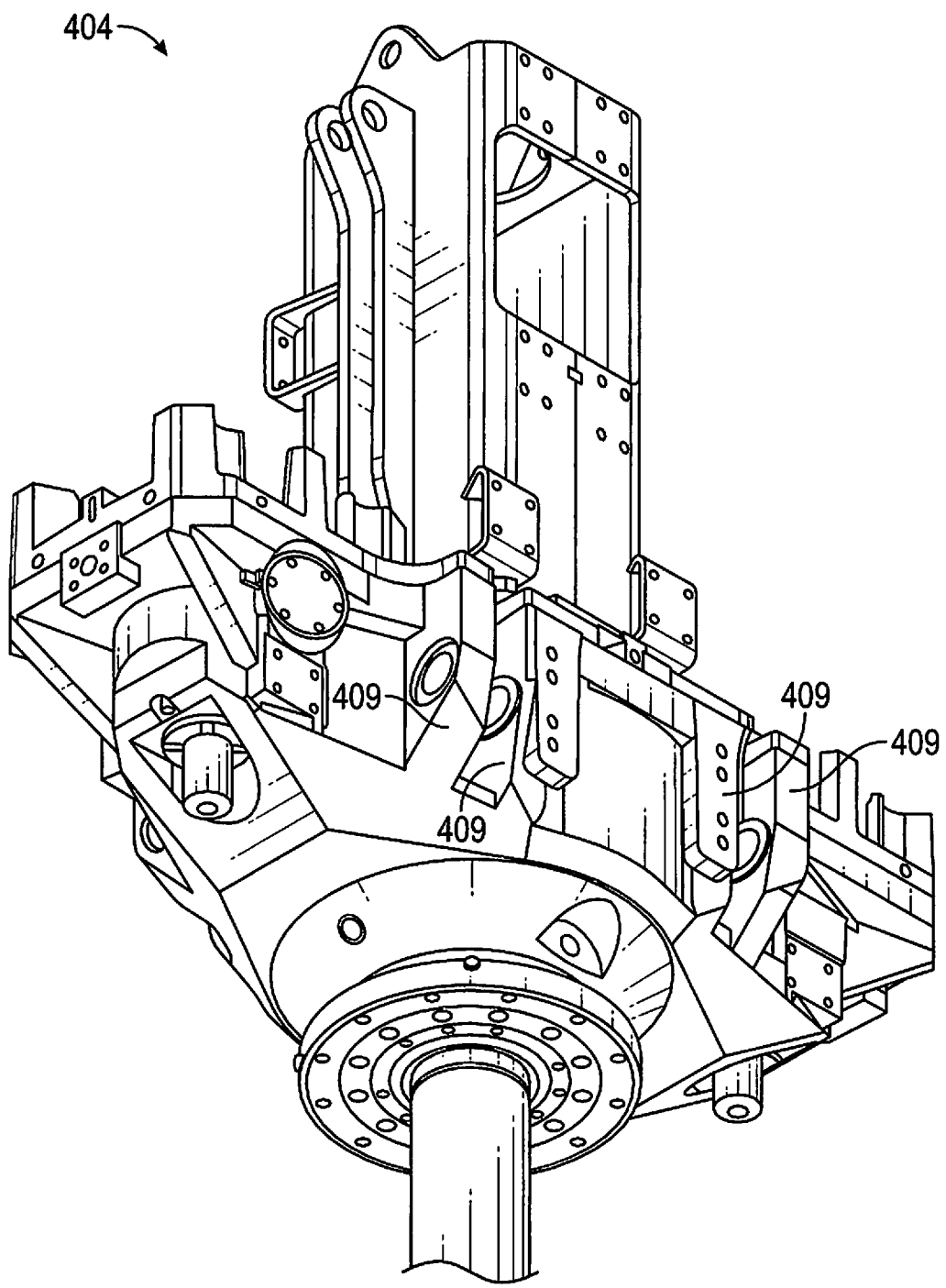
FIGS. 7A and 7B are perspective views of a gearbox assembly of the top drive shown in FIG. 4A.
Figure 7B:
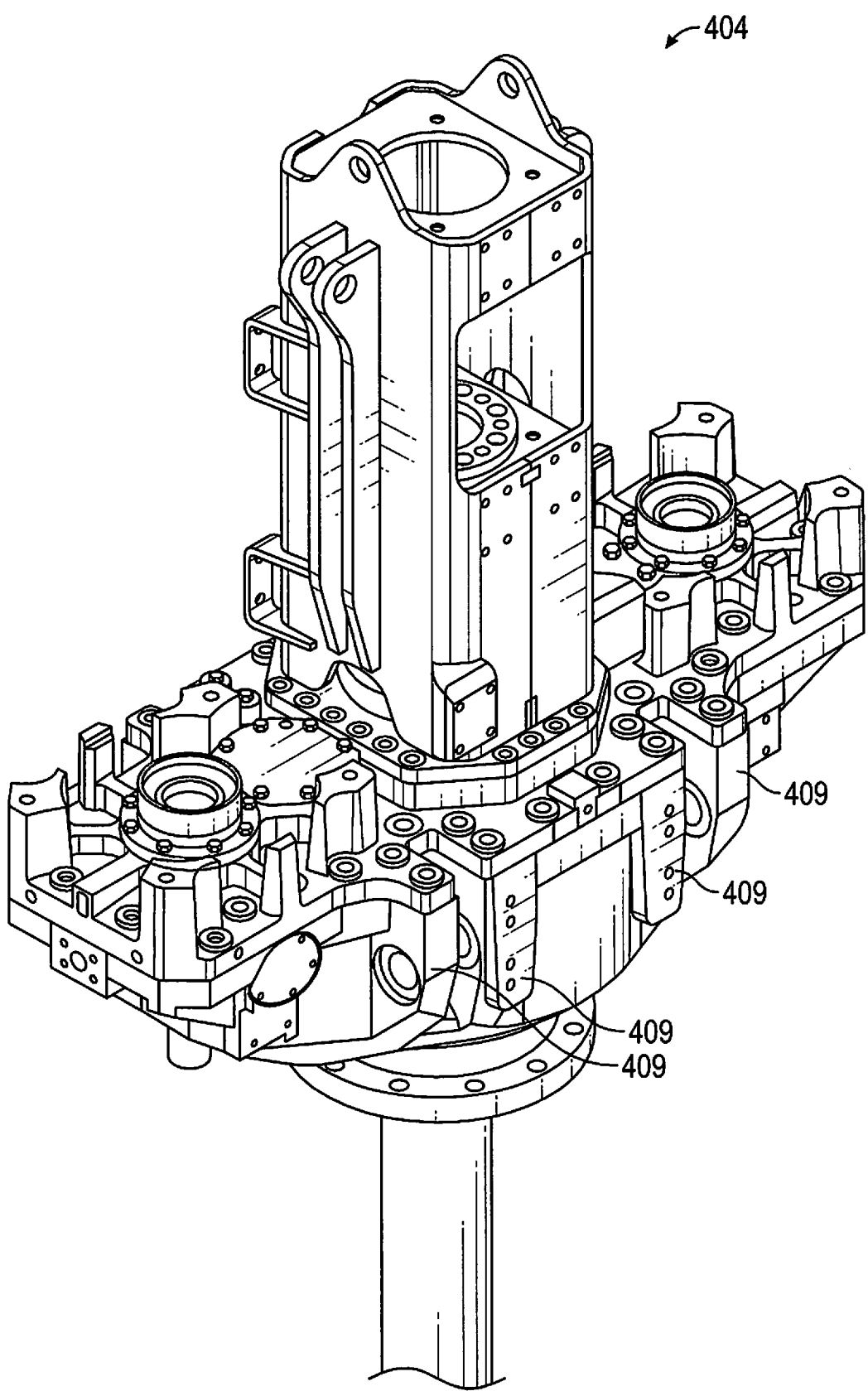

Perspective views of the gearbox assembly 404 are shown in FIGS. 7A and 7B. At four positions on the exterior of the gearbox housing, two clevis flanges 409 extend from the housing. Each clevis flange 409 has a hole for receiving a lower bail pin 428 (see FIG. 6A). The lower end 426 of the tie rod 422 is inserted between the two clevis flanges 409 to align the lower pin receiving hole 424 in the tie rod 422 with the holes in the clevis flanges 409, and a lower bail pin 428 is inserted therein to secure the gearbox assembly 404 to the tie rod 422. All four tie rods 422 may be similarly assembled with lower bail pins 428 to assemble the gearbox assembly 404 to the suspension system 420 (see FIGS. 4A and 4B).

Because upper bail pins 415 and lower bail pins 428 make connections that allow for rotation of the connected members, the gearbox assembly 404 may tilt slightly relative to the travelling block 402 during drilling operations. Further, the upper pin receiving hole 423 is elongated so that the tie rod 422 has the ability to translate up/down relative to the upper bail pin 415. This allows the gearbox assembly 304 to be moved vertically relative to the travelling block 402 when pipe sections are threaded to make-up drill string connections.

Referring again to FIGS. 6A-6D, these bar(s)/rod(s), here also named tie rods 422, have built in strain gauges that provide an electrical signal if the tie rod becomes subject to a tensile force. The strain gauges 429 may be glued inside the tie rod 422 in a configuration (strain gauge bridge) in such a way to measure the force even it comes from a non-straight line. Each tie rod 422 may have a strain gauge 429 and an amplifier 430. The strain gauges 429 may be located anywhere between the upper pin receiving hole 423 and the lower pin receiving hole 424, but in the embodiment illustrated, they are closer to the upper pin receiving hole 423.

As illustrated in FIGS. 6A-6D, acceleration sensors, e.g. stain gauges 429, may be located within holes against internal surfaces of the holes. The sensors may be oriented to detect and measure the desired parameter, such as weight on bit and/or torque on bit. By way of example, the sensor system may comprise one two or three shear strain gauges placed perpendicularly with respect to the direction of the axial load to detect weight on bit. In fact, any number of gauges may be used to detect tensile force in a tie rod 422. In this example, one sensor may be placed in each of two holes. The sensor system may also comprise two axial strain gauges placed radially and perpendicular with respect to the direction of the axial load. The sensors may be positioned with one sensor in each of two holes, or one sensor in each of three holes.

A strain gauge 429 whose electrical characteristics vary with fiber expansion of the rod portion 427 of the tie rod 422 may be attached inside the holes in the rod portion 427. The strain gauge 429 is solidly attached, as by gluing, inside the holes such that the fiber expansion of the strain gauge 429 will vary in direct proportion to the fiber expansion of the rod portion 427. The change in resistance ΔR of strain gauge 429 is proportional to the fiber expansion thereof.

The resistance of the strain gauge 429 may make up one arm of a Wheatstone bridge circuit which comprises the resistance due to strain gauge, wherein fixed resistors may comprise the other arms of the bridge, as is known to persons of skill in the art. An oscillator may be connected to a junction between resistors. The input of an amplifier may also be connected to a junction between resistors. The output from amplifier may be supplied to the computer controller.

A technique to physically amplify strain to facilitate measurement of strain/displacement may be implemented relative to the tie rods 322. For example, U.S. Pat. No. 8,739,868, incorporated herein by reference in its entirety, teaches that a strain amplifying mechanism may be mounted to a component being monitored for strain and comprises an input port and an output port. The strain amplifying mechanism may be attached to the component such that the input port moves when the component undergoes strain. Movement of the input port causes movement of the output port over a distance greater than the physical movement of the input port. A strain sensor is coupled to the output port to detect its movement over the greater distance.

As shown in FIGS. 6A-6D, each of the tie rods 422 has an amplifier 430 of the signals representative of the tensile stress observed by the sensors 329. The amplified signals may be communicated from the amplifiers 430 to the control system 100 for processing, as described above with reference to FIGS. 1-3. Where a plurality of tie rods 422 are used to suspend the top drive 300 via a travelling block 302, the control system 100 may combine the signals from the amplifiers 430 of the tie rods 422 to obtain the hookload. Alternatively the control system may combine the signals, wherein some of the signals are weighted more heavily than others, according to the configuration of the tie rods 322 in the suspension system 320.

Although the disclosed embodiments are described in detail in the present disclosure, it should be understood that various changes, substitutions and alterations can be made to the embodiments without departing from their spirit and scope.

What is claimed is:

1. A method for monitoring a drilling rig condition, the method comprising:
    suspending a drilling tool from a travelling block via a plurality of at least four vertical tie rods, each said tie rod including a lower pin receiving hole located toward a lower end of the tie rod, an upper pin receiving hole located toward an upper end of the tie rod, and a plurality of tensile sensor receiving holes located between said pin receiving holes;
    for each tie rod, fixing a tensile sensor against an internal surface of at least one tensile sensor receiving hole, wherein the tensile sensor generates a signal representative of tension in the tie rod;
    communicating the signal from the tensile sensors to a control system; and
    monitoring the signal with the control system.

2. A method as claimed in claim 1, wherein the suspending comprises suspending the drilling tool with four vertical tie rods.

3. A method as claimed in claim 1, wherein the communicating the signal comprises wirelessly communicating from the tensile stress sensor to a control system.

4. A system for monitoring a drilling rig condition, the system comprising:
    a travelling block suspended via a drilling line from a crown block at the top of a mast of the drilling rig;
    a frame to which drilling tools and/or a pipe string is mounted; and
    a suspension system that connects the frame to the travelling block, wherein the suspension system comprises:
    a plurality of at least four vertical tie rods; and
    a plurality of tensile sensors contained by the vertical tie rods;
    each said tie rod including:
        a lower pin receiving hole located toward a lower end of the tie rod;
        an upper pin receiving hole located toward an upper end of the tie rod; and
        at least one tensile sensor receiving hole located between said pin receiving holes; and
        a tensile sensor of the plurality of tensile sensors being located against an internal surface of the at least one tensile sensor receiving hole.

5. A system as claimed in claim 4, wherein the frame comprises a gearbox assembly to which at least one motor is attached.

6. A system as claimed in claim 4, wherein the suspension system comprises a tie rod and the tensile sensor is a strain gauge integrated in the tie rod.

7. A system as claimed in claim 4, wherein the suspension system further comprises an amplifier of a signal corresponding to tension sensed by the tensile sensor.

8. A system as claimed in claim 4, further comprising a control system that receives a signal corresponding to tension sensed by the tensile sensor.

9. A system as claimed in claim 8, wherein the control system determines a hookload based at least in part on the four signals received from the tensile sensors.

10. A system as claimed in claim 8, wherein the control system determines a weight on bit based at least in part on the four signals received from the tensile sensors.

11. A system for monitoring hookload in a drilling rig, the system comprising:
    a travelling block suspended via a drilling line from a crown block at the top of a mast of the drilling rig;
    a frame to which drilling tools and/or a pipe string is mounted;
    at least one tie rod that connects the frame to the travelling block, wherein the at least one tie rod comprises a lower pin receiving hole located toward a lower end of the tie rod, an upper pin receiving hole located toward an upper end of the tie rod; a strain gauge receiving hole located between said pin receiving holes, and a strain gauge located against an internal surface of the strain gauge receiving hole; and a control system that receives a signal corresponding to tension sensed by the strain gauge, wherein the control system determines hookload based at least in part on the signal received from the strain gauge.

12. A system as claimed in claim 11, wherein the at least one tie rod comprises a plurality of tie rods and the strain gauge comprises a plurality of strain gauges, wherein at least one strain gauge is integrated in each tie rod.

13. A system as claimed in claim 11, wherein the at least one tie rod further comprises an amplifier of a signal corresponding to tension sensed by the strain gauge.

14. A system as claimed in claim 11, wherein the at least one tie rod comprises four tie rods and the strain gauge comprises at least four strain gauges, wherein at least one sensor is integrated in each tie rod and each strain gauge produces a signal corresponding to tension sensed by the strain gauge, wherein the control system receives four signals from at least four strain gauges.

* * * * *